United States Patent
Wang et al.

(10) Patent No.: US 12,289,055 B2
(45) Date of Patent: Apr. 29, 2025

(54) FLYBACK CIRCUIT AND CONTROL METHOD OF CLAMPING SWITCH OF FLYBACK CIRCUIT

(71) Applicant: Delta Electronics (Shanghai) Co., Ltd., Shanghai (CN)

(72) Inventors: Qiangqiang Wang, Shanghai (CN); Daofei Xu, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 229 days.

(21) Appl. No.: 17/947,225

(22) Filed: Sep. 19, 2022

(65) Prior Publication Data

US 2023/0336086 A1    Oct. 19, 2023

(30) Foreign Application Priority Data

Apr. 14, 2022 (CN) .......................... 202210391978.X

(51) Int. Cl.
*H02M 3/335* (2006.01)
(52) U.S. Cl.
CPC ............................... *H02M 3/33569* (2013.01)
(58) Field of Classification Search
CPC ................................................ H02M 3/33569
See application file for complete search history.

(56) References Cited

U.S. PATENT DOCUMENTS

| 10,742,124 B2 | 8/2020 | Chen et al. | |
| 2014/0233275 A1* | 8/2014 | Yang | H02M 3/33576 363/21.17 |
| 2018/0226895 A1* | 8/2018 | Song | H02M 1/32 |

FOREIGN PATENT DOCUMENTS

| CN | 108696131 A | 10/2018 |
| CN | 108696132 A | 10/2018 |
| CN | 108696133 B | 2/2020 |
| TW | 201818642 A | 5/2018 |
| TW | I741882 B | 10/2021 |

* cited by examiner

*Primary Examiner* — Harry R Behm
(74) *Attorney, Agent, or Firm* — KIRTON McCONKIE; Evan R. Witt

(57) ABSTRACT

A flyback circuit and a control method of a clamping switch of the flyback circuit are provided. The flyback circuit includes a transformer, a main switch, a clamping capacitor, a clamping switch, and a secondary rectifier unit. The transformer includes primary and secondary windings with a turns ratio of K. The main switch and the primary winding are connected in series to receive an input voltage. The clamping switch and the clamping capacitor are connected in series and then connected to the primary winding in parallel. The secondary rectifier unit and the secondary winding are connected in series to provide an output voltage to a load. The control method includes: when a product of K and the output voltage is greater than or equal to the input voltage, controlling the clamping switch to turn on M times during N consecutive switching cycles of the main switch, where I≤M<N.

14 Claims, 5 Drawing Sheets

FLYBACK CIRCUIT AND CONTROL METHOD OF CLAMPING SWITCH OF FLYBACK CIRCUIT

CROSS-REFERENCE TO RELATED APPLICATION

This application claims priority to China Patent Application No. 202210391978.X, filed on Apr. 14, 2022, the entire contents of which are incorporated herein by reference for all purposes.

FIELD OF THE INVENTION

The present disclosure relates to a flyback circuit and a control method thereof, and more particularly to a flyback circuit and a control method of a clamping switch of the flyback circuit.

BACKGROUND OF THE INVENTION

Nowadays, with the development of miniaturization for power adapters, the requirement for efficiency is increasing.

When the power adapter adopts a quasi-resonant flyback circuit, under low input voltage condition, the main switch can be turned on with zero voltage through the resonance of the parasitic capacitor of the main switch and the magnetizing inductor of the transformer. However, when the input voltage is high, the zero-voltage turn-on for the main switch cannot be realized through resonance. In order to solve this problem, active clamping, which includes complementary active clamping and non-complementary active clamping, is commonly used. The non-complementary active clamping is used more widely due to its high efficiency at the light load and at the full load with high input voltage. When the non-complementary active clamping is used, although the zero-voltage turn-on of the main switch can be achieved without turning on the clamping switch under low input voltage condition, the energy stored in the clamping capacitor would accumulate and cause overvoltage if the clamping switch is always turned off. Therefore, it is necessary to turn on the clamping switch for a while under low input voltage condition. Under low input voltage condition, since the clamping switch is turned on for releasing the excess energy in the clamping capacitor only, the required turn-on time of the clamping switch is really short. However, due to the chip manufacturing process, the minimum turn-on time of the clamping switch is limited, and thus the actual turn-on time of the clamping switch cannot be short enough to just release the energy in the clamping capacitor. Moreover, with the conventional control method, the clamping switch is turned on every switching cycle of the main switch, which causes an additional negative current in the circuit. Due to the additional negative current, the peak current and the RMS current are increased, the magnetic core loss and the conduction loss are increased, and the efficiency at full load with low input voltage is reduced. Consequently, with regard to the flyback circuit using non-complementary active clamping, the main obstacle to the improvement of efficiency is the efficiency at full load with low input voltage.

Therefore, there is a need of providing a flyback circuit and a control method of a clamping switch of the flyback circuit in order to overcome the drawbacks of the conventional technologies.

SUMMARY OF THE INVENTION

The present disclosure provides a flyback circuit and a control method of a clamping switch of the flyback circuit, which reduce the total turn-on time of the clamping switch by reducing the times of turning on the clamping switch. Consequently, the additional negative current generated by turning on the clamping switch is reduced, the magnetic core loss and the conduction loss are reduced, and the efficiency under low input voltage condition is improved.

In accordance with an aspect of the present disclosure, a control method of a clamping switch of a flyback circuit is provided. The flyback circuit includes a transformer, a main switch, a clamping capacitor, a clamping switch, and a secondary rectifier unit. The transformer includes a primary winding and a secondary winding, and a turns ratio of the primary winding to the secondary winding is K, which is a positive number. The main switch and the primary winding are connected in series to receive an input voltage. The clamping switch and the clamping capacitor are connected in series and then connected to the primary winding in parallel. The secondary rectifier unit and the secondary winding are connected in series to provide an output voltage to a load. The control method includes: when a product of K and the output voltage is greater than or equal to the input voltage, controlling the clamping switch to turn on M times during N consecutive switching cycles of the main switch, where $1 \leq M < N$. M and N are integers.

In accordance with another aspect of the present disclosure, a flyback circuit is provided. The flyback circuit includes a transformer, a main switch, a clamping capacitor, a clamping switch, and a secondary rectifier unit. The transformer includes a primary winding and a secondary winding, and a turns ratio of the primary winding to the secondary winding is K, which is a positive number. The main switch and the primary winding are connected in series to receive an input voltage. The clamping switch and the clamping capacitor are connected in series and then connected to the primary winding in parallel. The secondary rectifier unit and the secondary winding are connected in series to provide an output voltage to a load. When a product of K and the output voltage is greater than or equal to the input voltage, the clamping switch is turned on M times during N consecutive switching cycles of the main switch, where $1 \leq M < N$, and M and N are integers.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
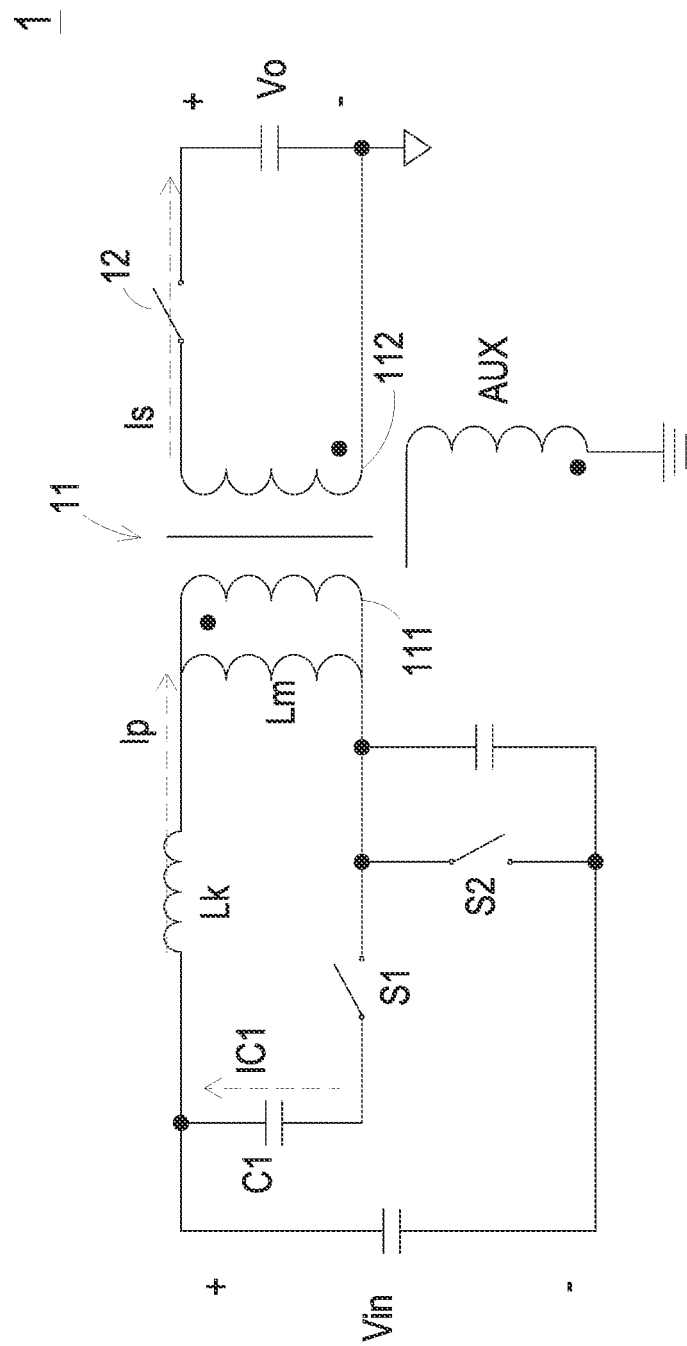
FIG. 1 is a schematic circuit diagram illustrating a flyback circuit according to an embodiment of the present disclosure.

FIG. 1 is a schematic circuit diagram illustrating a flyback circuit according to an embodiment of the present disclosure. As shown in FIG. 1, the flyback circuit 1 includes a transformer 11, a clamping capacitor C1, a clamping switch S1, a main switch S2, and a secondary rectifier unit 12. In FIG. 1, the primary current is marked as Ip, the secondary current is marked as Is, and the current flowing through the clamping capacitor C1 is marked as IC1. The transformer 11 includes a primary winding 111 and a secondary winding 112, and the turns ratio of the primary winding 111 to the secondary winding 112 is K, where K is a positive number. The main switch S2 and the primary winding 111 are connected in series to receive an input voltage Vin. The clamping switch S1 and the clamping capacitor C1 are connected in series and then connected to the primary winding 111 in parallel. The secondary rectifier unit 12 and the secondary winding 112 are connected in series to provide an output voltage Vo to a load. The secondary rectifier unit 12 may be an active switch, but not limited thereto. In addition, in FIG. 1, Lk is a leakage inductor of the transformer 11, and Lm is a magnetizing inductor of the transformer 11.

A control method of the clamping switch S1 of the flyback circuit 1 is described in detail as follows.

The main function of turning on the clamping switch S1 is realizing zero-voltage turn-on for the main switch S2 and releasing the energy in the clamping capacitor C1. When the product of K and the output voltage Vo is greater than or equal to the input voltage Vin (i.e., under low input voltage Vin condition), zero-voltage turn-on of the main switch S2 can be realized even though the clamping switch S1 is not turned on. Accordingly, the turn-on frequency and length of the clamping switch S1 only need to be sufficient for releasing the energy in the clamping capacitor C1. Therefore, with low input voltage Vin, the clamping switch S1 is controlled to turn on M times during N consecutive switching cycles of the main switch S2, where $1 \leq M<N$, and M and N are integers. Thereby, the total turn-on time of the clamping switch S1 is reduced through reducing the times of turning on the clamping switch S1. Consequently, the additional negative current generated by turning on the clamping switch S1 is greatly reduced, the magnetic core loss and the conduction loss are reduced, and the efficiency under low input voltage condition is improved.

In an embodiment, when the product of K and the output voltage Vo is greater than or equal to the input voltage Vin, the clamping switch S1 is controlled to turn on only once during four consecutive switching cycles of the main switch S2, i.e., M/N=1/4. In an embodiment, in order to reduce the additional negative current as much as possible on the premise that the energy in the clamping capacitor C1 is sufficiently released, M and/or N may be changed to adjust the value of M/N when at least one of the output voltage Vo, the input voltage Vin and K changes. For example, when the output voltage Vo increases, the value of M/N may be decreased correspondingly.

In addition, when the product of K and the output voltage Vo is smaller than the input voltage Vin (under high input voltage Vin condition), it is determined whether an absolute value of the difference between K times the output voltage Vo and the input voltage Vin (i.e., |K*Vo−Vin|) is less than a default value. If the result is yes, the clamping switch S1 is controlled to turn on M times during N consecutive switching cycles of the main switch S2. If the result is no, the clamping switch S1 is controlled to turn on once in every switching cycle of the main switch S2.

Figure 2A:
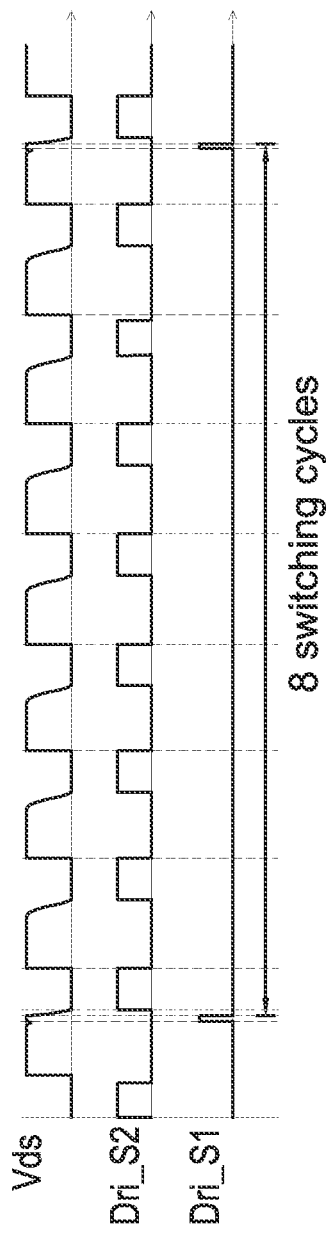
FIG. 2A and FIG. 2B schematically shows the operating waveforms of the flyback circuit 1 operating in a critical mode and a discontinuous mode respectively.
Figure 2B:
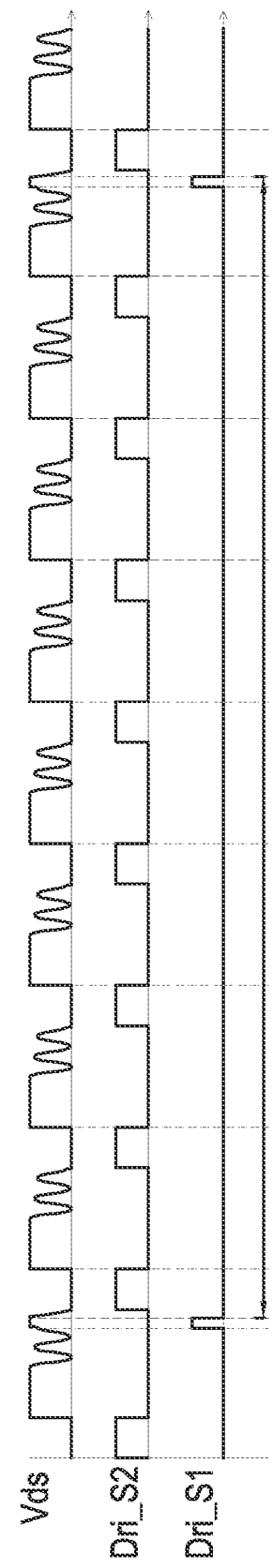
Figure 3A:
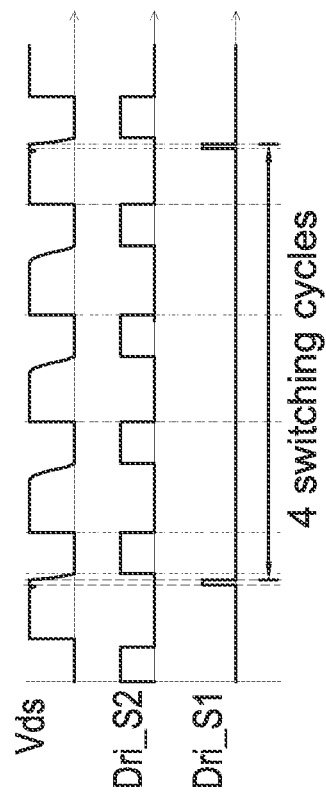
FIG. 3A and FIG. 3B schematically shows variants of the FIG. 2A and FIG. 2B respectively.
Figure 3B:
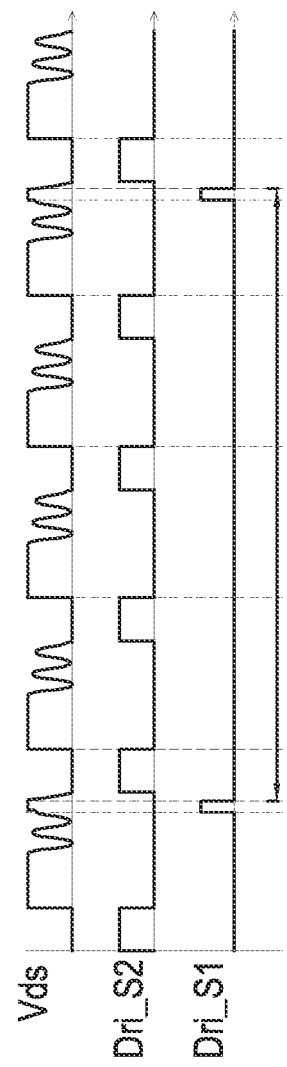

As the magnitude of the load changes, the operating mode of the flyback circuit 1 also changes accordingly. In an embodiment, the flyback circuit 1 operates in a critical mode (i.e., critical discontinuous mode) when the load is greater than or equal to a threshold, and the flyback circuit 1 operates in a discontinuous mode when the load is less than the threshold. FIG. 2A and FIG. 2B schematically shows the operating waveforms of the flyback circuit 1 operating in a critical mode and a discontinuous mode respectively. In FIG. 2A and FIG. 2B, Vds is a voltage across the main switch S2, Dri_S1 is a driving signal of the clamping switch S1, and Dri_S2 is a driving signal of the main switch S2. In the example shown in FIG. 2A and FIG. 2B, the clamping switch S1 is turned on once during eight consecutive switching cycles of the main switch S2 (i.e., M/N=1/8), but not limited thereto actually. For example, as shown in FIG. 3A and FIG. 3B, the clamping switch S1 may be turned on once during four consecutive switching cycles of the main switch S2 (i.e., M/N=1/4). During the switching cycle in which the clamping switch S1 is not turned on, the energy stored in the leakage inductor charges the clamping capacitor C1 for storing energy in the clamping capacitor C1. As the clamping switch S1 is turned on, the energy in the clamping capacitor C1 is released, and energy stored in the leakage inductor is recycled.

Figure 4:
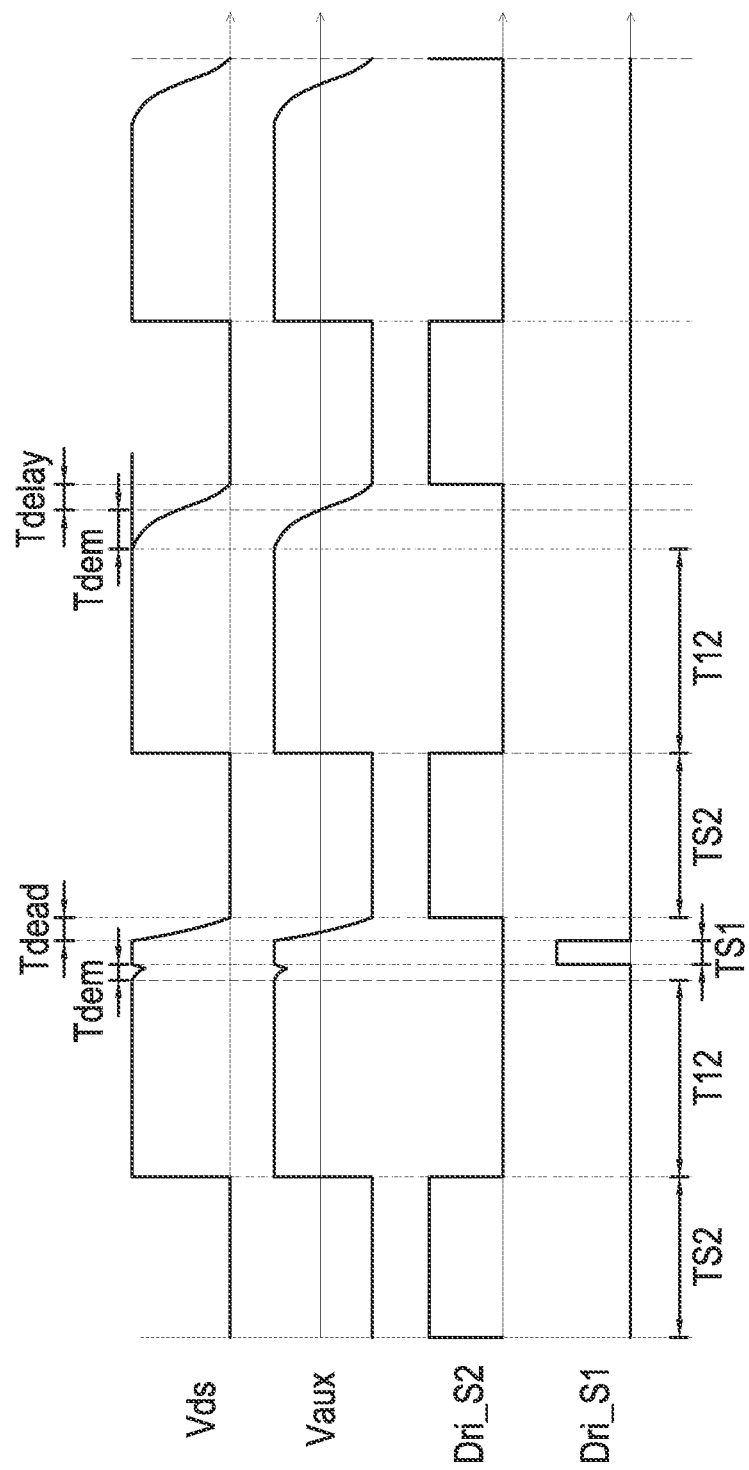
FIG. 4 is a schematic waveform showing a period of time of FIG. 2A.

Please refer to FIG. 1 and FIG. 4. FIG. 4 is a schematic waveform showing a period of time of FIG. 2A. When the flyback circuit 1 operates in the critical mode, during the switching cycle (the switching cycle the main switch S2) that the clamping switch S1 is turned on, firstly, the main switch S2 is turned on, the energy is stored in the magnetizing inductor Lm, and the turn-on time of the main switch S2 is TS2. After the main switch S2 is turned off, the secondary rectifier unit 12 is turned on to demagnetize the transformer 11, and the turn-on time of the secondary rectifier unit 12 is T12. After the secondary rectifier unit 12 is turned off, it is detected whether the demagnetization for the transformer 11 is finished, and the demagnetization detection time is Tdem. After it is detected that the demagnetization for the transformer 11 is finished, the clamping switch S1 is turned on for releasing the energy in the clamping capacitor C1, and the turn-on time of the clamping switch S1 is TS1. When the clamping switch S1 is turned off, the switching cycle ends after a dead time Tdead of the clamping switch S1 and the main switch S2. In addition, in the switching cycle that the clamping switch S1 is not turned on, when it is detected that the demagnetization for the transformer 11 has finished, the switching cycle ends after a delay time Tdelay.

Figure 5:
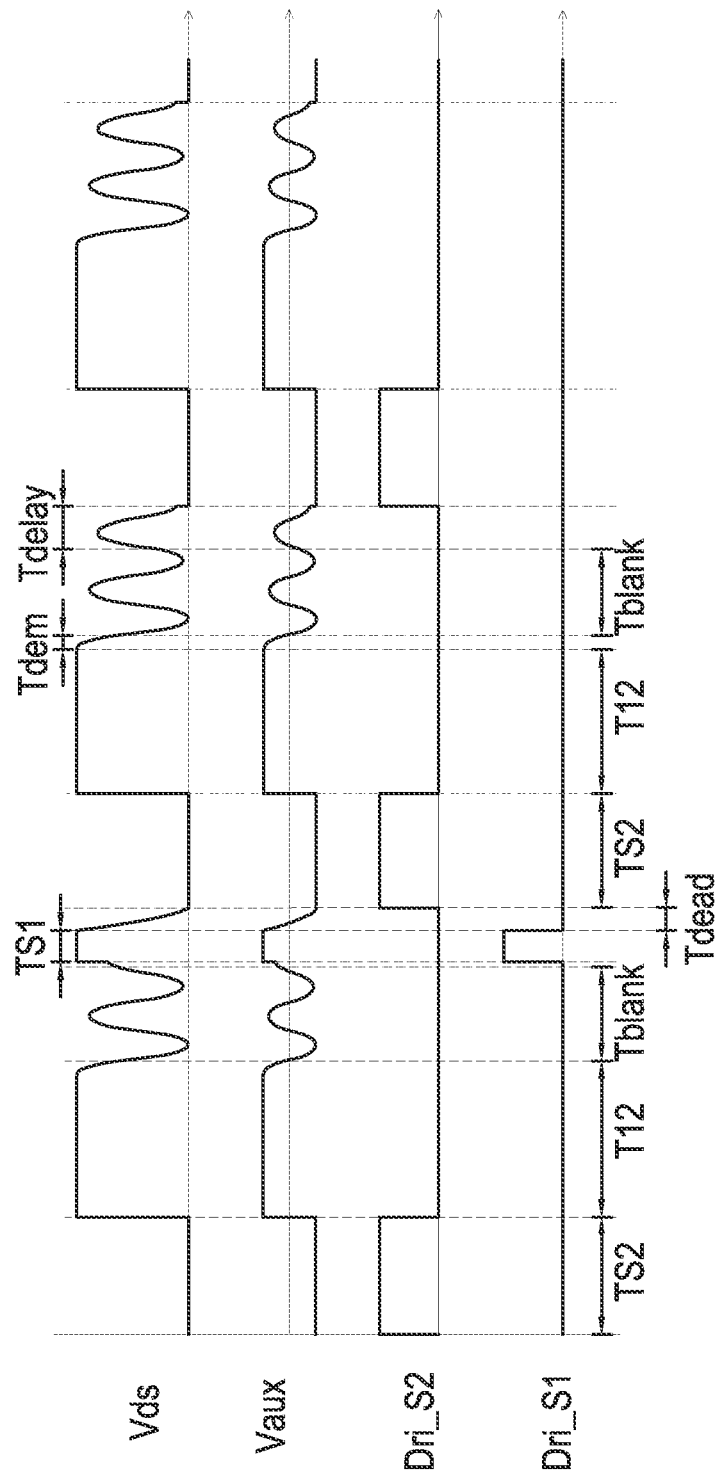
FIG. 5 is a schematic waveform showing a period of time of FIG. 2B.

Please refer to FIG. 1 and FIG. 5. FIG. 5 is a schematic waveform showing a period of time of FIG. 2B. When the flyback circuit 1 operates in the discontinuous mode, during the switching cycle (the switching cycle of the main switch S2) in which the clamping switch S1 is turned on, the main switch S2 is turned on first, and the energy is stored in the magnetizing inductor Lm. After the main switch S2 is turned off, the secondary rectifier unit 12 is turned on to demagnetize the transformer 11. After the secondary rectifier unit 12 is turned off, (i.e., after the transformer 11 is demagnetized), the voltage Vds across the main switch S2 oscillates, thereby reducing the frequency and improving the efficiency at light load. As the voltage Vds oscillates, the peak value of the voltage Vds decreases gradually. The length of the oscillation time Tblank of the voltage Vds depends on the desired frequency reduction amplitude. The clamping switch S1 is turned on when the voltage Vds across the main switch S2 oscillates to a peak, so as to release the energy in the clamping capacitor C1. When the clamping switch S1 is turned off, the switching cycle ends after a dead time Tdead between the clamping switch S1 and the main switch S2. In addition, in the switching cycle during which the clamping switch S1 is not turned on, when the voltage Vds across the main switch S2 has oscillated for a required period of time, the switching cycle ends after the delay time Tdelay.

In an embodiment, as shown in FIG. 1, the flyback circuit 1 further includes an auxiliary winding AUX. Moreover, as shown in FIG. 4 and FIG. 5, a shape of a waveform of a voltage Vaux across the auxiliary winding AUX is the same as that of the voltage Vds across the main switch S2. Since the magnitude of the voltage Vaux is smaller, the voltage Vaux is easier to be detected. Therefore, when the detection (e.g., the demagnetization detection) is actually performed, the voltage Vaux may be detected instead of the voltage Vds.

In summary, the present disclosure provides a flyback circuit and a control method of a clamping switch of the flyback circuit, which can reduce the total turn-on time of the clamping switch by reducing the times of turning on the clamping switch. Consequently, the additional negative current generated by turning on the clamping switch is reduced, the magnetic core loss and the conduction loss are reduced, and the efficiency under low input voltage is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method of a clamping switch of a flyback circuit, wherein the flyback circuit comprises a transformer, a main switch, a clamping capacitor, a clamping switch, and a secondary rectifier unit, the transformer comprises a primary winding and a secondary winding, a turns ratio of the primary winding to the secondary winding is K, which is a positive number, the main switch and the primary winding are connected in series to receive an input voltage, the clamping switch and the clamping capacitor are connected in series and then connected to the primary winding in parallel, the secondary rectifier unit and the secondary winding are connected in series to provide an output voltage to a load, and the control method comprises:
   when a product of K and the output voltage is greater than or equal to the input voltage, controlling the clamping switch to turn on M times during N consecutive switching cycles of the main switch, wherein 1=<M<N, and M and N are integers; and
   when at least one of the output voltage and K changes, adjusting M/N correspondingly.

2. The control method according to claim 1, further comprising: when the input voltage changes, adjusting M/N correspondingly.

3. The control method according to claim 1, further comprising: when the product of K and the output voltage is less than the input voltage, determining whether an absolute value of a difference between the product and the input voltage is less than a default value, wherein if the result is yes, the clamping switch is controlled to turn on M times during N consecutive switching cycles of the main switch, and if the result is no, the clamping switch is controlled to turn on once in every switching cycle of the main switch.

4. The control method according to claim 1, further comprising: controlling the flyback circuit to operate in a critical mode when the load is greater than or equal to a threshold, and controlling the flyback circuit to operate in a discontinuous mode when the load is less than the threshold.

5. The control method according to claim 4, wherein when the flyback circuit operates in the critical mode, the control method further comprises: in the switching cycle during which the clamping switch is turned on, turning on the clamping switch after demagnetizing the transformer for releasing energy in the clamping capacitor.

6. The control method according to claim 4, wherein when the flyback circuit operates in the discontinuous mode, the control method further comprises: in the switching cycle during which the clamping switch is turned on, turning on the clamping switch when a voltage across the main switch oscillates to a peak, so as to release energy in the clamping capacitor.

7. The control method according to claim 1, wherein when the product of K and the output voltage is greater than or equal to the input voltage, the clamping switch is turned on once during four consecutive switching cycles of the main switch.

8. A flyback circuit, comprising:
   a transformer, comprising a primary winding and a secondary winding, wherein a turns ratio of the primary winding to the secondary winding is K, and K is a positive number;
   a main switch, wherein the main switch and the primary winding are connected in series to receive an input voltage;
   a clamping capacitor and a clamping switch, connected in series and then connected to the primary winding in parallel;
   a secondary rectifier unit, wherein the secondary rectifier unit and the secondary winding are connected in series to provide an output voltage to a load,
   wherein when a product of K and the output voltage is greater than or equal to the input voltage, the clamping switch is turned on M times during N consecutive switching cycles of the main switch, where 1=<M<N, and M and N are integers,
   wherein when at least one of the output voltage and K changes, M/N is adjusted correspondingly.

9. The flyback circuit according to claim 8, wherein when the input voltage changes, M/N is adjusted correspondingly.

10. The flyback circuit according to claim 8, wherein when the product of K and the output voltage is less than the input voltage, the clamping switch is turned on M times during N consecutive switching cycles of the main switch if an absolute value of a difference between the product and the input voltage is less than a default value, and the clamping switch is turned on once in every switching cycle of the main switch if the absolute value is greater than or equal to the default value.

11. The flyback circuit according to claim 8, wherein the flyback circuit operates in a critical mode when the load is greater than or equal to a threshold, and the flyback circuit operates in a discontinuous mode when the load is less than the threshold.

12. The flyback circuit according to claim 11, wherein when the flyback circuit operates in the critical mode, in the switching cycle during which the clamping switch is turned on, the clamping switch is turned on after the transformer is demagnetized for releasing energy in the clamping capacitor.

13. The flyback circuit according to claim 11, wherein when the flyback circuit operates in the discontinuous mode, in the switching cycle during which the clamping switch is turned on, the clamping switch is turned on when a voltage across the main switch oscillates to a peak, so as to release energy in the clamping capacitor.

14. The flyback circuit according to claim 8, wherein when the product of K and the output voltage is greater than or equal to the input voltage, the clamping switch is turned on once during four consecutive switching cycles of the main switch.

* * * * *